United States Patent

[11] 3,577,123

[72] Inventors James R. Taylor
Allendale, N.J.;
Thomas C. Clements, New York, N.Y.
[21] Appl. No. 733,372
[22] Filed May 31, 1968
[45] Patented May 4, 1971
[73] Assignee Neptune Meter Company
New York, N.Y.

[54] METER READING SYSTEM
9 Claims, 4 Drawing Figs.
[52] U.S. Cl. .................................................... 340/146.1,
340/347
[51] Int. Cl. ..................................................... G01d 3/08,
G11b 27/36, H03k 13/34
[50] Field of Search .......................................... 340/146.1,
347

[56]                References Cited
              UNITED STATES PATENTS
3,466,602  9/1969  Moser et al. ................... 340/146.1
3,164,727  1/1965  Heyda ............................ 340/146.1X
3,200,242  8/1965  Crawford et al. .............. 340/146.1X Primary Examiner—Malcolm A. Morrison
Assistant Examiner—R. Stephen Dildine, Jr.
Attorneys—Robert S. Dunham, P. E. Henninger, Lester W. Clark, Thomas F. Moran, Gerald W. Griffin, Howard J. Churchill, R. Bradlee Boal, Christopher C. Dunham and John F. Ohlandt, Jr.

ABSTRACT: In a system for reading meter registers and the like, special error detecting circuits are provided in the meter reading and recording apparatus forming part of the system. For every character recorded two error checks are performed, one at the decimal level, and a further one at the binary level. The decimal check determines if there are any errors that have been introduced due to faults anywhere in the decimal portion of the system, including the entire house installation. Such errors might arise, for example, due to open or short circuits within such installation. A fault at the decimal level will result in a "no digit/multidigit" or "house error" indication being given. The binary check determines if the recorder electronics are working properly. A fault at the binary level will result in an incorrect parity indication, or "recorder error" being given.

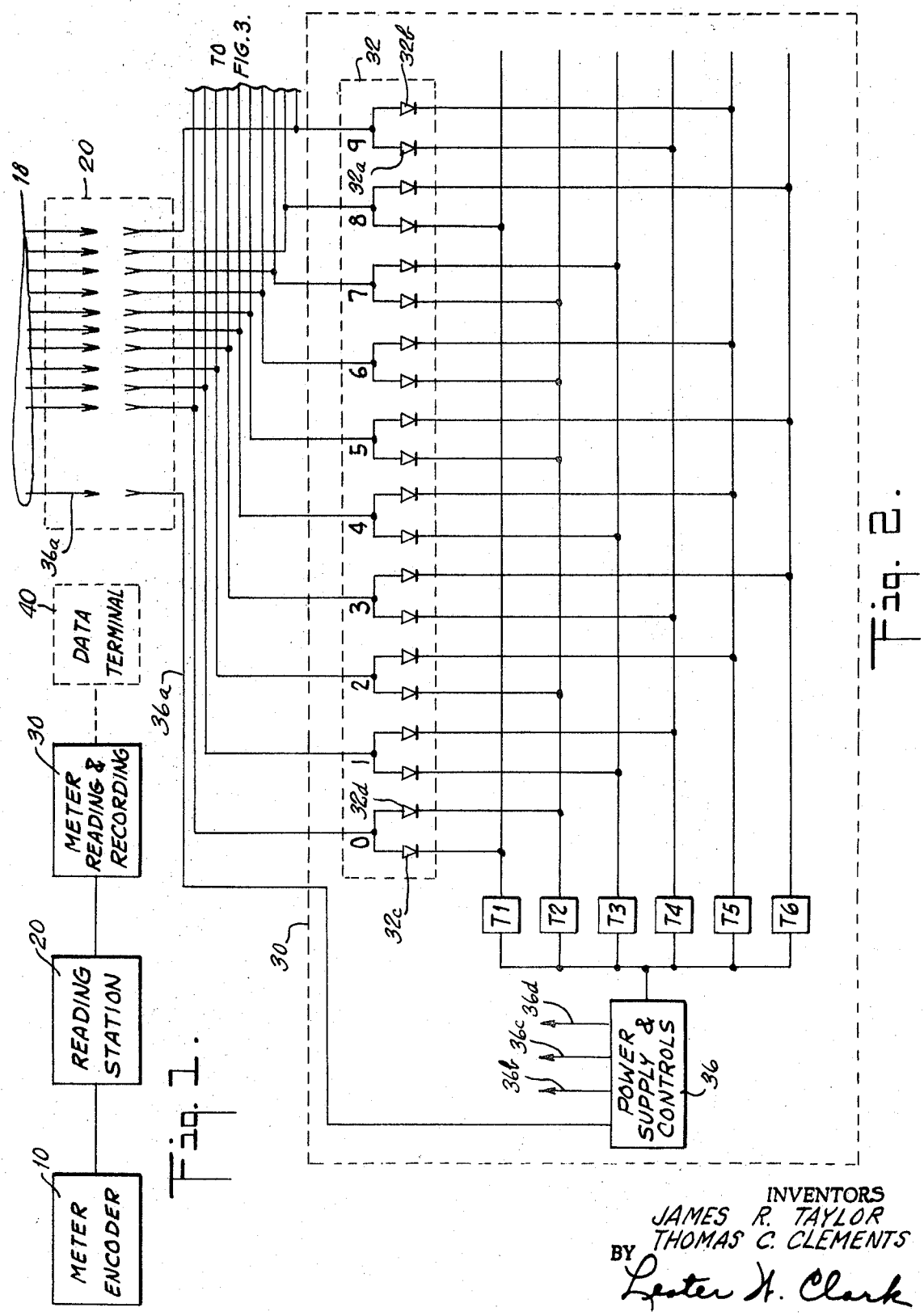

3,577,123

METER READING SYSTEM

BACKGROUND, OBJECTS & SUMMARY OF THE INVENTION

This invention relates to meter reading systems, and more particularly, to an improvement in meter reading apparatus so as to detect errors in the received data arising from improper operation of the system.

The present invention concerns error detecting circuits which are conceived as particularly adapted for use in connection with a meter reading system described in copending application, Ser. No. 733,392, filed concurrently, in 2 the name of Thomas C. Clements, and assigned to the assignee of the present invention. The system described in the aforesaid copending application may be considered as comprising a meter encoder, meter reading and recording apparatus, and a data terminal.

In the set up of that system, the meter encoder is constructed to be mounted on a meter register and to operate in response to the movement of the register shaft to convert the dial indicator readings into digital signals representative of the analog quantities being measured. The meter reading and recording apparatus is connected to the encoder at a reading station where there is typically provided a suitable receptacle mounted on the outside of a building. The meter reading apparatus includes magnetic tape a magnetic tape recorder on whose tracks are recorded the information as to the meter register shaft positions in the form of binary coded characters representative of the decimal digit values. The meter reading apparatus is light weight and portable and is carried to the reading station by the meter reader. Also included in such apparatus is an encoding network which cooperates with the encoder for producing the necessary binary coded signals. In addition, associated power supply and control equipment is included in the meter reading apparatus for selectively connecting to the encoder elements on the several meter registers so as to read out their information content.

In the meter reading operation described above, the interval of time necessary to record the data is short and the meter reader need not enter the building to make such reading. Thus, the speed of the reading process is greatly increased, and in addition, accuracy is increased because human error is virtually eliminated.

Once sufficient information as to the various meter readings has been accumulated the recorded information is "played back" at a data terminal at which is provided a computer or the like for billing purposes.

In spite of the fact that accuracy is greatly increased because of the elimination of human errors, there are difficulties in obtaining proper reading of the meter registers because of mechanical and electrical faults that may occur in the system. Thus, faults will plague the operation due to open circuit and short circuit conditions existing in the house installation. Unless such faults were immediately detectable, they would result in false reading that would be recorded and which would be later processed resulting in billing errors.

Accordingly, it is a primary object of the present invention to detect faults in the system so that false readings which results will not enter the system and be processed.

A further object of the present invention is to detect "no digit" and "multidigit" conditions which correspond with faults that have occurred in the meter reading system and to provide an alarm indicating such faults.

Inevitably, too, errors are introduced due to faults in the recorder itself, that is, in the electrical wiring or the like and it is another object of the present invention to provide an indication of an error which arises due to a fault in the recorder.

The foregoing and other objects, features and advantages of the invention will be apparent from the following more particular description of preferred embodiments of the invention, as illustrated in the accompanying drawings.

BRIEF DESCRIPTION OF THE DRAWINGS:

FIG. 1 is a block diagram of the complete system in which the error detecting circuits of the present invention are designed to be incorporated.

FIG. 2 is a schematic diagram of the meter reading and recording apparatus used in the meter reading system.

DESCRIPTION OF PREFERRED EMBODIMENTS

Figure 3:
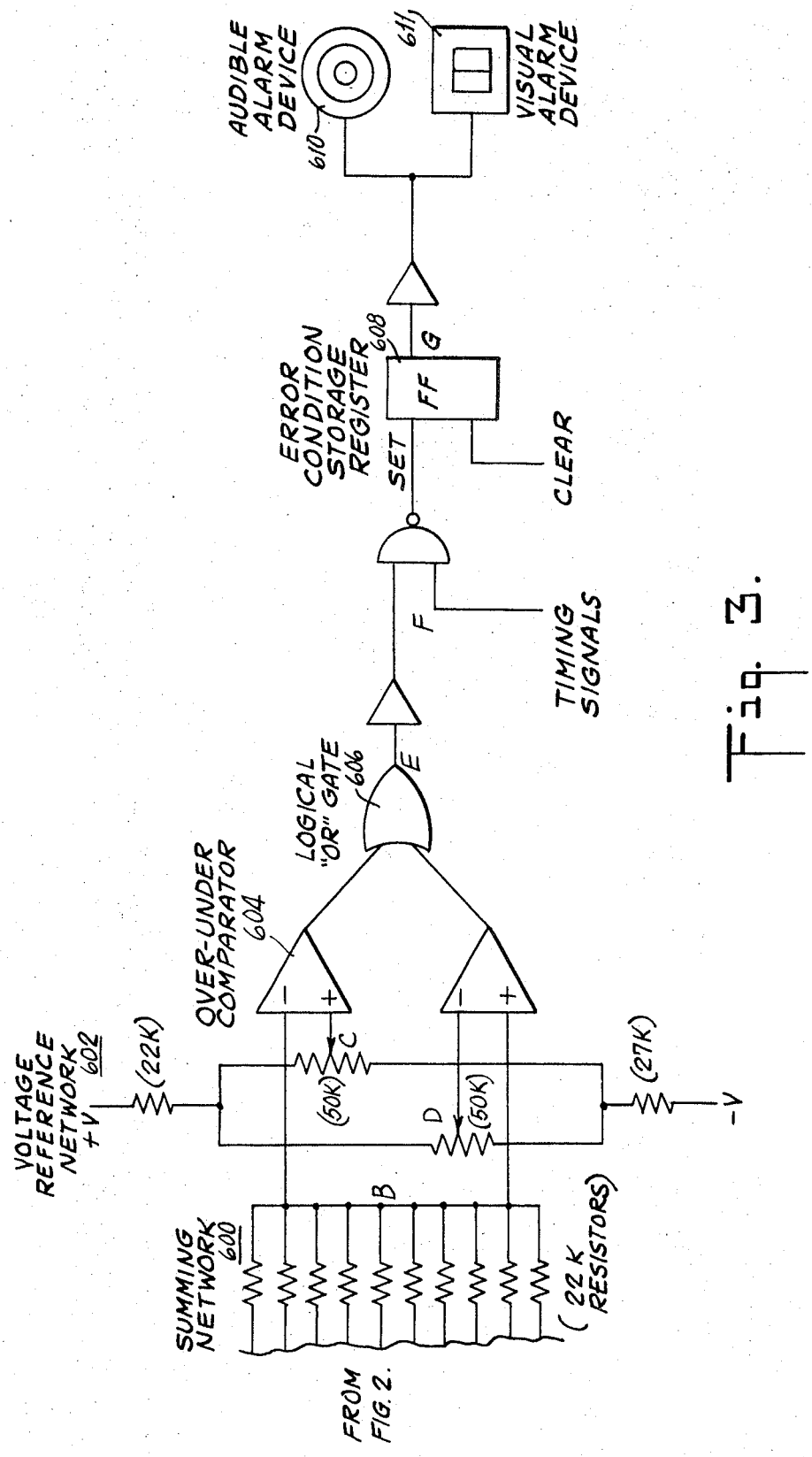
FIG. 3 is a schematic diagram of the error detecting circuit for detecting errors due to no digit and multidigit conditions.

Referring now to FIG. 1, the complete meter reading system is shown by means of the four blocks designated 10, 20, 30 and 40. The data terminal 40 is shown in dotted lines since this equipment is used separately, i.e. only when recorded information is to be taken from the apparatus 30.

The encoder 10 may be appreciated in detail by reference to copending application, Ser. No. 733,392. This encoder comprises a group of encoder elements, each of which is essentially a 10-position decimal switch affixed to one of the significant meter registers.

A typical encoder element is affixed to one register of a meter to respond to its shaft position. Referring to FIG. 2, a complete circuit for the digital "read out" of a selected meter register is established by way of an outgoing line 36a, which is connected to the power supply or source 36. The "return" is by way of one of the lines 18, seen at the top of FIG. 2, the particular line functioning for this purpose depending of course, on which decimal digit segment of an encoder element is, at a given moment, being contacted by the wiping contact or brush. Other similar outgoing lines 36b, 36c and 36d which are not shown completed in FIG. 2 extend to the other encoder elements for the same essential operation. Thus, each of the encoder elements is selectively read out as desired.

The circuits described above are "made," that is, they are enabled to be completed because of the connection that has been made at the reading station 20 shown in FIG. 2. In other words, a suitable plug and receptacle arrangement is provided at this reading station 20 so that the apparatus 30 may be easily and detachably connected to the encoder 10.

The antiambiguity code of copending application Ser. No. 733,392 is shown implemented by the inclusion of the encoding network 32 which forms part of the meter reading and recording apparatus 30. This encoding network functions to translate the decimal digit reading into 2-out-of-6 binary code characters corresponding to the main decimal digits and also 4-out-of-6 binary code characters represented by the ambiguous states or conditions. The 4-out-of-6 code characters are derived by the simple conjunction of adjacent decimal digits in their binary form.

Referring now to FIG. 3, a schematic diagram of the several components of the first, or no digit/multidigit, error detecting circuit is shown. This circuit checks the incoming decimal data for correctness, that is, it checks the information directly as it comes in from the input lines 18 of FIG. 2 and before signals are applied to the diode encoding network 32 for translation into binary coded characters. By means of the controls provided in the apparatus 36, each of the outgoing lines 36a, 36b, 36c, and 36d is energized in sequence, and a signal appears on a line 18 as determined by the decimal digit position of the particular encoder element being scanned. Under normal conditions one and only one of the lines 18 is provided with a voltage level corresponding to a respective decimal digit position, except for an ambiguity condition, to be explained. Under abnormal conditions when a scan occurs, it could turn out that none of these lines has a proper voltage level or signal (no-digit condition). On the other hand, it could happen that too many of the lines 18 are provided with signals (multidigit condition). The former condition, for example, would result from an "open" circuit such that the signal normally to be applied is not received. The latter condition would result typically from a crossed-wire condition such that signals that should not appear do, in fact, appear on unwanted lines.

The first component of the no-digit/multidigit error correcting circuit is an analog summing network 600 which has its plurality of inputs connected respectively to the input lines 18. This network forms the sum of the voltages on the input lines and this sum is weighted by a scale factor of about one-tenth. If no decimal digits are present, which means that there is a fault, such as an open circuit, the sum will be zero. However, if one digit is present this sum will be approximately one-tenth of the logical one level. If two or more digits are present this sum will be the corresponding number times a tenth of the logical one level. Thus, there is a voltage at the summing node, denoted as point B, which is related to the number of digits present.

A voltage reference network 602 establishes two reference voltages, one of which is a low voltage corresponding to less than one digit at the point B, and the other a high voltage corresponding to more than two digits at this same point. The reason that the high voltage is selected to correspond to the presence of more than two digits, is that in the context of the antiambiguity code, already described, the encoder normally provides two decimal digits at the ambiguous states and conditions. However, if this antiambiguity feature is not incorporated in the encoder, the high voltage could be selected to correspond to the presence of more than one digit. In other words, the presence of two digits would denote a multidigit error condition. Conveniently, the reference voltages, i.e. +V and −V are selected to have a value of 6 volts each.

A comparator device 604 which is an over-under comparator, comprising two separate comparator units, has its inputs connected to the node point or point B and separate connections are made at the points C and D, to the respective potentiometers included in the reference network 602. The comparator is thus arranged to sense if the higher of these two reference (point C) is exceeded, which is the multidigit condition; or if the input is below the lower of these two references (point D) which is the no-digit condition. Thus, essentially what is established is a tolerance band, that is, a band between the voltages which correspond to less than one digit and to more than two digits. If the voltage at point B falls outside this tolerance band, a logical signal appears at point E by way of the logical OR gate 606 which acts to combine the outputs of the two comparators constituting device 604.

When an abnormal condition does take place, it is sampled during an appropriate part of the writing cycle by the timing signals (point F). This condition then causes the error condition storage resistor 608 to be set (point G). When this register is set, a suitable amplifier connected to it senses this condition and causes both an audible alarm and a visual alarm, by means of devices 610 and 611, to be activated in the recorder. The audible alarm is conveniently provided by a tone oscillator, and the visual alarm is conveniently provided by an electromechanical "flag" which changes from white to red as a result of the aforesaid condition. The error condition storage register 608 can be reset simply by means of the clear line. In other words, a suitable input is provided here and is activated by means of a switch on the recorder panel.

Summarizing the operation of the error detecting circuit of FIG. 3, an input line 18 is either at a logical zero voltage or at a logical one level. Under normal conditions, one and only one input line is at a logical one, except for ambiguities which cause two adjacent lines to have logical ones. The conditions are determined by summing the voltages on all the input lines, and comparing this sum to the two preestablished reference potentials. If this sum fails to compare properly to the reference potentials it indicates that either no digits are present or that multidigits are present. If either of these conditions obtains, then this causes the register to be set and an alarm to be given to the operator.

Figure 4:
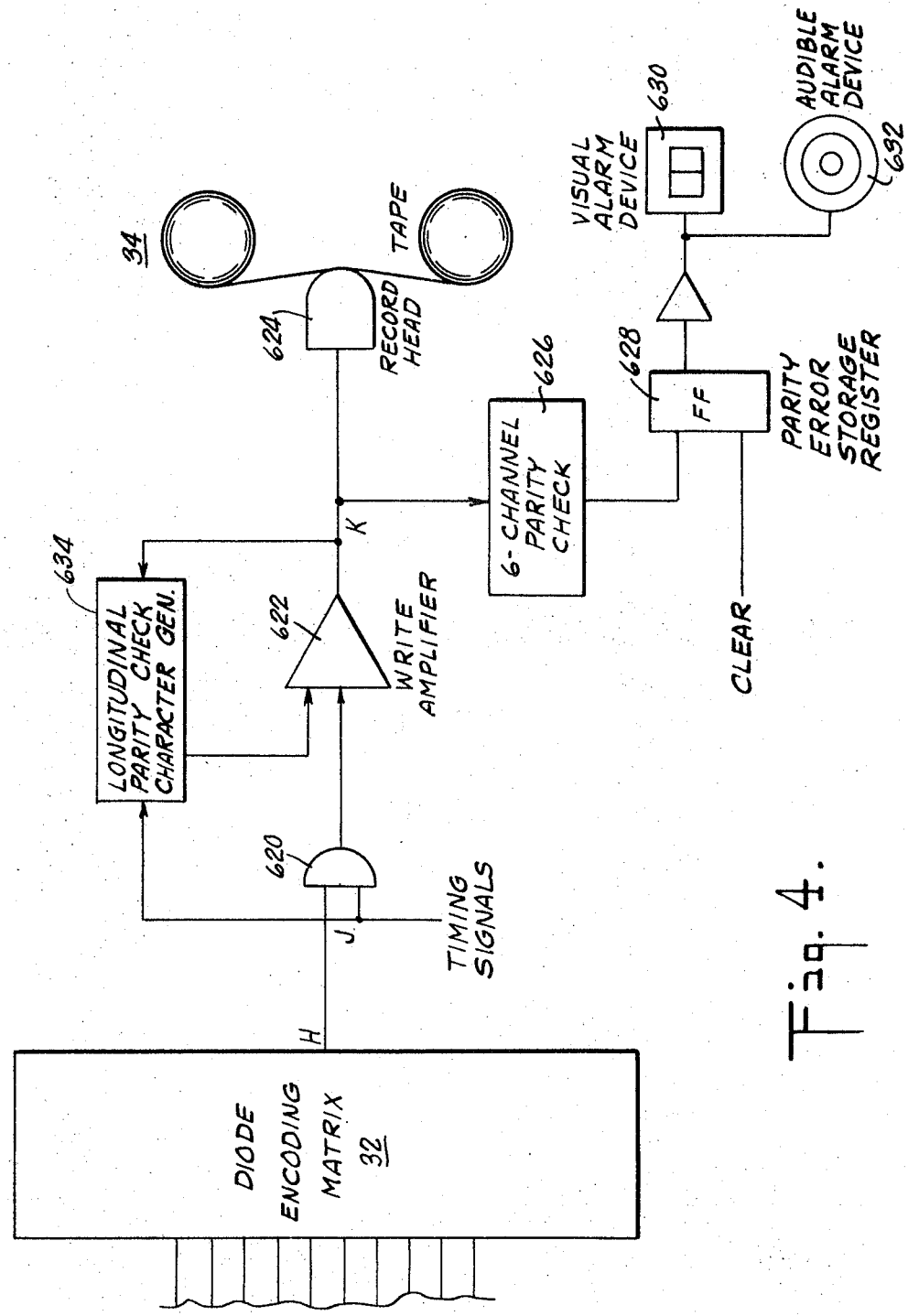
FIG. 4 is a schematic diagram of the error correcting circuit for detecting recorder errors.

Referring now to FIG. 4, there is illustrated the second error detecting system in accordance with the present invention. This scheme operates at the binary level, that is, at a point following the encoding of the decimal information into binary coded characters. The purpose of this error detecting arrangement is to check out the entire recorder electronics, that is, to make sure there are no errors developed within the recording equipment as part of the apparatus 30.

It must be borne in mind that the specific embodiment illustrated in FIG. 4 is contemplated for use in a system employing the antiambiguity code described in copending application Ser. No. 733,392. This binary code is a constant and even parity code (2-out-of-6 bits or 4-out-of-6) even with ambiguity. Thus, by the nature of the coding scheme, each character that is to be written on magnetic tape can be expected to have constant and even parity if the recorder electronics are functioning properly. The only exception to this is the case in which a multidigit error is present in such a way to cause combinations of coding that generate abnormal, i.e. odd, parity. However, in this case the problem is taken care of by the error detecting circuit of FIG. 3 already described.

FIG. 4 shows the essentials of the error detecting scheme but includes some of the associated apparatus already depicted in FIG. 2. That is to say, the diode encoding matrix 32 is shown in block form and the recorder per se, that is, the recording means 34 is again shown, but here, by simply illustrating the record head and the magnetic tape, rather than in the form previously shown in FIG. 2 of a simple plurality of tracks. Shown connected to the diode encoding matrix 32 are the normal decimal input lines 18 already discussed. It will be understood that although only 10 lines have been shown, that is, only the lines for the main decimal digits, other input lines can also be connected to this diode encoding matrix, such as special character input lines, for example, for purposes of identifying the account number or for special purposes.

For the sake of simplicity the binary coded characters which emerge are shown as emerging on a single line at point H at the output of the encoding matrix 32. At the proper time, timing signals applied at point J cause gating of these characters into the write amplifiers, only one of which 622 is shown in FIG. 4. These write amplifiers then drive the record head 624. At point K there are, in the recorder, six channels of binary coded information available to be checked just prior to their recording by means of the record head. Across these six channels a conventional parity-checking logical tree, symbolized by the block designated 626 and composed of a succession of exclusive-or networks, operates to check the parity condition. If incorrect parity occurs, the parity error storage register 628 is caused to be set at an appropriate time in the write cycle. When the register 628 is set, it activates a suitable amplifier which in turn causes both a visual alarm and an audible alarm to be given by means of the devices 630 and 632 respectively.

It should be noted that in FIG. 4, another device known as a longitudinal parity check character generator 634 is connected in the circuit, if found desirable. This device is useful in connection with the receipt of data by the data terminal 40. In such case if there is a parity error, and if the error is known to be single, a network in the data terminal will be able to correct the error by using the information provided from the longitudinal parity check character generator 634.

Summarizing the basic operation of the circuit of FIG. 4, the binary code used is a constant and even parity code. The parity of the information being fed to the record head of the recorder 34, after encoding the matrix 32, is checked by the parity checking network 626. Thereby, for each character, the entire tape recorder electronics, with the exception of the head itself, is checked for proper operation. The only case in which a false error check is given is when a multidigit is recorded but is of the type that causes abnormal parity. However, when this occurs it is indicated on the front panel by an alarm responsive to the no-digit/multidigit detector.

What has been disclosed herein, is an improved analog-digital system adapted for the reading of meter registers and the like. Special error detecting circuits are provided in the meter reading and recording apparatus and two levels of error checking are provided. The first level is at the level of decimal data, and the error checking circuit for this purpose checks the data up to the encoding matrix in the recorder for consistency. The second level of error checking is at the level of binary data and the error checking circuit for this purpose checks the operation of the recorder apparatus from and including the encoding matrix through to the recording heads. Thus, error checking is performed on each and every character with respect to the performance of the encoding device, and on the receptacle and cabling; furthermore, with respect to the proper functioning of the entire tape recorder.

While there have been shown and described and pointed out the fundamental novel features of the invention as applied to the preferred embodiments, it will be understood that various omissions and substitutions and changes in the form and details of the device illustrated and in its operation may be made by those skilled in the art and without departing from the spirit of the invention. It is the intention, therefore, to be limited only as indicated by the scope of the following claims.

1. In a system adapted to read decimal digits, corresponding to analog quantities, and to encode same into binary form,
   the improvement which comprises means for sensing faults within the system prior to the encoding apparatus, said means comprising a circuit for detecting a no-digit and a multidigit condition corresponding to faults in the system, and including;
   an analog summing network for forming the sum of the signal voltages on a plurality of input lines and for providing an output signal corresponding to the number of decimal digits present at the input;
   a voltage reference network for establishing two fixed reference voltages;
   a comparator for sensing whether the output from the analog summing network exceeds the higher of the two fixed reference voltages and thus corresponds to the presence of at least two decimal digits, or is below the lower of the two reference voltages and thus corresponds to the presence of no decimal digits;
   means for sensing whether either condition exists and for providing a single output alarm signal uniquely indicative of either condition.

2. In a system adapted as defined in claim 1, wherein said binary form comprises characters in six channels, further including means for recording the binary coded characters:
   the further improvement which comprises means for checking for errors introduced by the recording means comprising a parity error checking circuit, said circuit being connected to the output of said encoding network and including means for checking the six channels containing the binary coded characters for parity, and means for providing an alarm signal responsive to an incorrect parity.

3. A system adapted to read the decimal digit positions of a meter register, corresponding to analog quantities, and to encode same into binary form and in which ambiguities are present between said decimal digit positions comprising:
   a binary code generating means for generating a binary code of constant and even parity for the main characters representing each of the decimal digits and also for the ambiguous characters representing the ambiguous states between decimal digits;
   said binary code generating means comprising an encoder and an encoding network, said encoder comprising a plurality of conductive segments and including a means for sensing the decimal digit positions of a meter register, said encoding network being connected to said encoder for producing the binary code characters for the main decimal digits responsive to contacting each of said conductive segments and for producing the binary code characters for ambiguous states in response to contacting pairs of adjacent conductive segments;
   recording means for recording the binary coded signals from said encoding network;
   means for sensing faults within the meter reading system prior to said encoding netowrk, said means comprising a circuit for detecting a no-digit and multidigit condition corresponding to faults in the system and including;
   an analog summing network for forming the sum of the signal voltages on a plurality of input lines and for providing an output voltage corresponding to the number of decimal digits present at the input;
   a voltage reference network for establishing two fixed reference voltages;
   a comparator for sensing whether the output from the analog summing network exceeds the higher of the two fixed reference voltages and thus corresponds to the presence of at least two decimal digits, or is below the lower of the two reference voltages and thus corresponds to the presence of no decimal digits; and
   means for sensing whether either condition exists and for providing a single output alarm signal uniquely indicative of such condition.

4. Apparatus as defined in claim 3, in which said encoding network comprises a pair of diodes connected to each of said plurality of conductive segments.

5. Apparatus as defined in claim 3, which said recording means records the binary coded signals from each of said pairs of diodes.

6. Apparatus as defined in claim 3, in which said encoding network comprises a pair of diodes connected to each of said plurality of conductive segments, each pair of diodes being connected to a discrete combination of pairs of recording tracks in said recording means.

7. Apparatus as defined in claim 6, in which those pairs of said diodes which are connected, at their first ends, to adjacent segments on said encoder are also connected at their opposite ends to distinctive pairs of said recording tracks.

9. A system adapted to read the decimal digit positions of a meter register, corresponding to analog quantities and to encode same into binary form and in which ambiguities are present between said decimal digit positions, comprising:
   a binary code generating means for generating a binary code of constant and even parity for the main characters representing each of the decimal digits and also for the ambiguous characters representing the ambiguous states between decimal digits;
   said binary code generating means comprising an encoder and an encoding network, said encoder comprising a plurality of conductive segments and including a means for sensing the decimal digit positions of a meter register, said encoding network being connected to said encoder for producing the binary code characters for the main decimal digits responsive to contacting each of said conductive segments and for producing the binary code characters for ambiguous states in response to contacting pairs of adjacent conductive segments;
   recording means, including a recording head, for recording the binary coded signals from said encoding network;
   means for checking exclusively for those errors introduced by the recording means comprising a parity-error checking circuit, said circuit being connected and operative to check for errors introduced between said encoding network and said recording head; and
   means for providing an alarm signal responsive to an incorrect parity.

9. Apparatus as defined in claim 8, further including:
   means for sensing faults within the system prior to the said encoding network, said means comprising a circuit for detecting a no-digit and multidigit condition corresponding to faults in the system and including;
   an analog summing network for forming the sum of the signal voltages on a plurality of input lines and for providing an output voltage corresponding to the number of decimal digits present at the input;
   a voltage reference network for establishing two fixed reference voltages;

a comparator for sensing whether the output from the analog summing network exceed the higher of the two fixed reference voltages and thus corresponds to the presence of at least two decimal digits, or is below the lower of the two reference voltage and thus corresponds to the presence of no decimal digits; and means for sensing whether either condition exists and for providing an alarm signal indicative of such condition.

UNITED STATES PATENT OFFICE
CERTIFICATE OF CORRECTION

Patent No. 3,577,123　　　　　　　　　Dated May 4, 1971

Inventor(s) James R. Taylor and Thomas C. Clements

It is certified that error appears in the above-identified patent and that said Letters Patent are hereby corrected as shown below:

Column 1, line 13, after "in" delete the numeral "2".

Column 1, line 27, after "includes" and before "a" delete "magnetic tape".

Column 3, line 37, "reference" should be -- references --.

Column 3, line 49, change "storage resistor" to -- storage register --.

Column 3, line 62, after "voltage" insert -- level --.

Column 3, line 74, change "system" to -- scheme --.

Column 4, line 33, before "special" insert -- other --.

Column 6, after claim "7" change claim "9" to -- 8 --.

Column 8, line 1, change "voltage" to -- voltages --.

Signed and sealed this 14th day of September 1971.

(SEAL)
Attest:

EDWARD M. FLETCHER, JR.
Attesting Officer

ROBERT GOTTSCHALK
Acting Commissioner of Patents